United States Patent [19]

Swartz et al.

[11] Patent Number: 4,503,622
[45] Date of Patent: Mar. 12, 1985

[54] PRECISION INCLINOMETER WITH DIGITAL NUMERICAL READOUT

[75] Inventors: Harold L. Swartz, Glendale; Thomas R. Hoogervorst, Scottsdale; Lynn R. Lane, Phoenix, all of Ariz.

[73] Assignee: Sperry Corporation, New York, N.Y.

[21] Appl. No.: 486,631

[22] Filed: Apr. 20, 1983

[51] Int. Cl.³ .............................................. G01C 9/06
[52] U.S. Cl. .................................................. 33/366
[58] Field of Search .......... 33/366; 340/689, 686–688; 377/17, 23, 24; 364/559

[56] References Cited

U.S. PATENT DOCUMENTS

| | | | |
|---|---|---|---|
| 4,085,375 | 4/1978 | Galuschak et al. | 33/366 X |
| 4,094,073 | 6/1978 | Parra | 33/366 |
| 4,167,818 | 9/1979 | Cantarella et al. | 33/366 |
| 4,289,382 | 9/1981 | Clark | 33/172 E |
| 4,356,638 | 11/1982 | McKenna et al. | 33/366 X |

Primary Examiner—Harry N. Haroian
Attorney, Agent, or Firm—Howard P. Terry; Arnold L. Albin

[57] ABSTRACT

An inclinometer providing a digital numerical readout includes a level sensor responsive to orientation and means for driving a liquid crystal display to indicate the inclination of a surface with a high degree of precision. Features include high stability with changes in battery voltage and surrounding temperature, a battery condition monitor, freedom from operational adjustments after the initial calibration, and partial blanking of the display to alert a user that the linear inclination limit has been reached. The direct reading digital readout permits ease of operation and a high degree of accuracy and repeatability. Circuitry is especially adapted for low power consumption.

15 Claims, 6 Drawing Figures

PRECISION INCLINOMETER WITH DIGITAL NUMERICAL READOUT

BACKGROUND OF THE INVENTION

1. Field of the Invention

The invention relates to leveling apparatus, and more particularly to a leveling device for displaying to a high degree of precision a numerical readout of the deviation from the horizontal or vertical.

2. Description of the Prior Art

Leveling devices are known in the prior art where the sensing element is a conventional arcuate bubble level. The bubble level comprises a glass vial partially filled with a liquid and having an air gap therein whose position responds to the inclination of the level. One specific application is the common use as a carpenter's level where such a vial is embedded in a linear member which provides the reference plane and is aligned with the surface to be leveled. Another such device uses a bubble level hooked to a string stretched between two points to establish a level or grade. A hand-held sight glass has also been used in combination with a calibrated bubble level for quick field observations. In the prior applications, such a level would have graduations etched thereon to define the deviation from horizontal or vertical surfaces to which the level was applied. However, these devices are relatively inaccurate due to the lack of precise angular calibration, and because they require visual interpretation by the observer of the position of the bubble with respect to the graduations. It is clear that this interpretation may vary from one observer to another, and over a period of time. Other means of measuring the levelness or adjusting a surface to a desired grade or angle include geometric instruments, such a surveyor's optical transit, but such devices are cumbersome and time consuming to use, although capable of providing a high degree of precision. Further, such instruments require an expertise that is not possessed by the layman, or indeed, the ordinary skilled craftsman. Moreover, scales such as used on a transit are susceptible to human error in reading, since they are essentially analog in nature and may require vernier interpolation.

SUMMARY OF THE INVENTION

The invention comprises an inclinometer providing a numerical readout, including a housing having a reference surface for registration with a surface to be aligned to a desired indicated slope, a power supply for energizing the inclinometer, a sensor mounted on the housing which responds to gravitational forces and provides an output which is a function of the orientation of the base relative to the horizontal, a signal source coupled to the sensor providing an output responsive to the sensor inclination, and a detector which responds to the sensor output, coupled to a numerical indicator for providing a readout proportional to the inclination.

Preferably, the inclinometer utilizes as a sensor a bubble level of the electrolytic type, partially filled with a suitable conductive liquid and provided with electrical contacts. A pulse signal is differentially coupled to the sensor to energize the device. The output of the sensor is digitized and used to drive a digital display device, such as a liquid crystal display. Novel circuitry for stabilizing the signal applied to the sensor provides a readout which is essentially linear and independent of power supply variations with time and temperature over a wide range. In the preferred embodiment, circuitry and components are selected to provide high stability with minimal power dissipation, thus assuring long life in the field when powered by a battery.

DESCRIPTION OF THE PREFERRED EMBODIMENT

Figure 1:
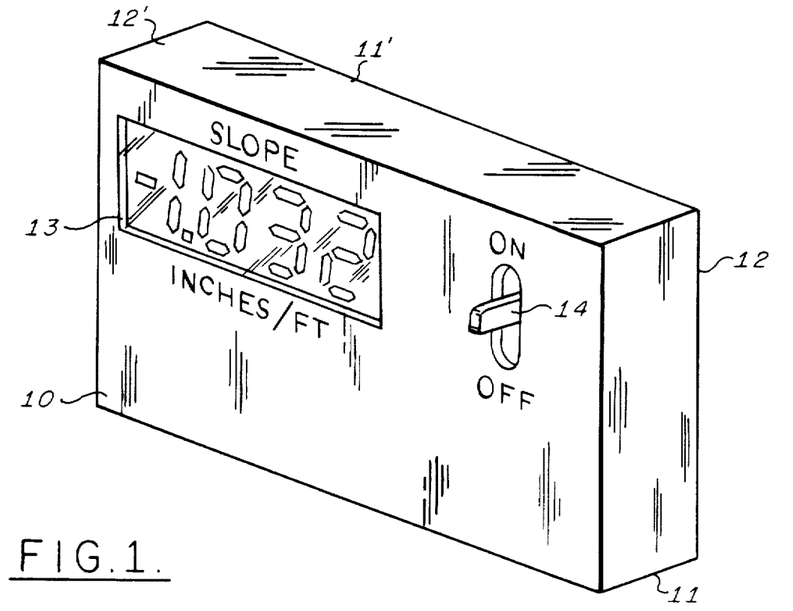
FIG. 1 is a conceptual view in perspective showing a leveling device as packaged for use in the present invention.

Referring to FIG. 1, a perspective view of a conceptual design of the inclinometer is shown. A housing 10 has a pair of parallel faces 11 and 11' adapted for measuring the tilt of essentially horizontal surfaces, and a second pair of parallel faces 12 and 12' at right angles to faces 11 and 11', adapted for measuring essentially vertical surfaces. A numerical readout 13 provides a digital display of slope to four significant figures, although other displays of more or less digits may be used. In the preferred embodiment, the display provides a range of approximately ±10°, or more precisely, 9.45° of inclination corresponding to 1.999 inches per foot. This represents the essentially linear range of the sensing element. For inclinations in excess of this range, decimal digits of the display are automatically blanked to alert the observer that the linear range has been exceeded. Angular units such as degree-minutes of arc or microradians may also be displayed with suitable calibration of the circuitry. While a liquid crystal display (LCD) is shown herein, other displays, such as light emitting diodes or even an expanded scale analog meter may be used, by appropriately adapting the drive circuitry, at the expense of increased current consumption. While a power switch 14 is provided, the device includes novel circuitry to minimize current consumption.

Figure 2:
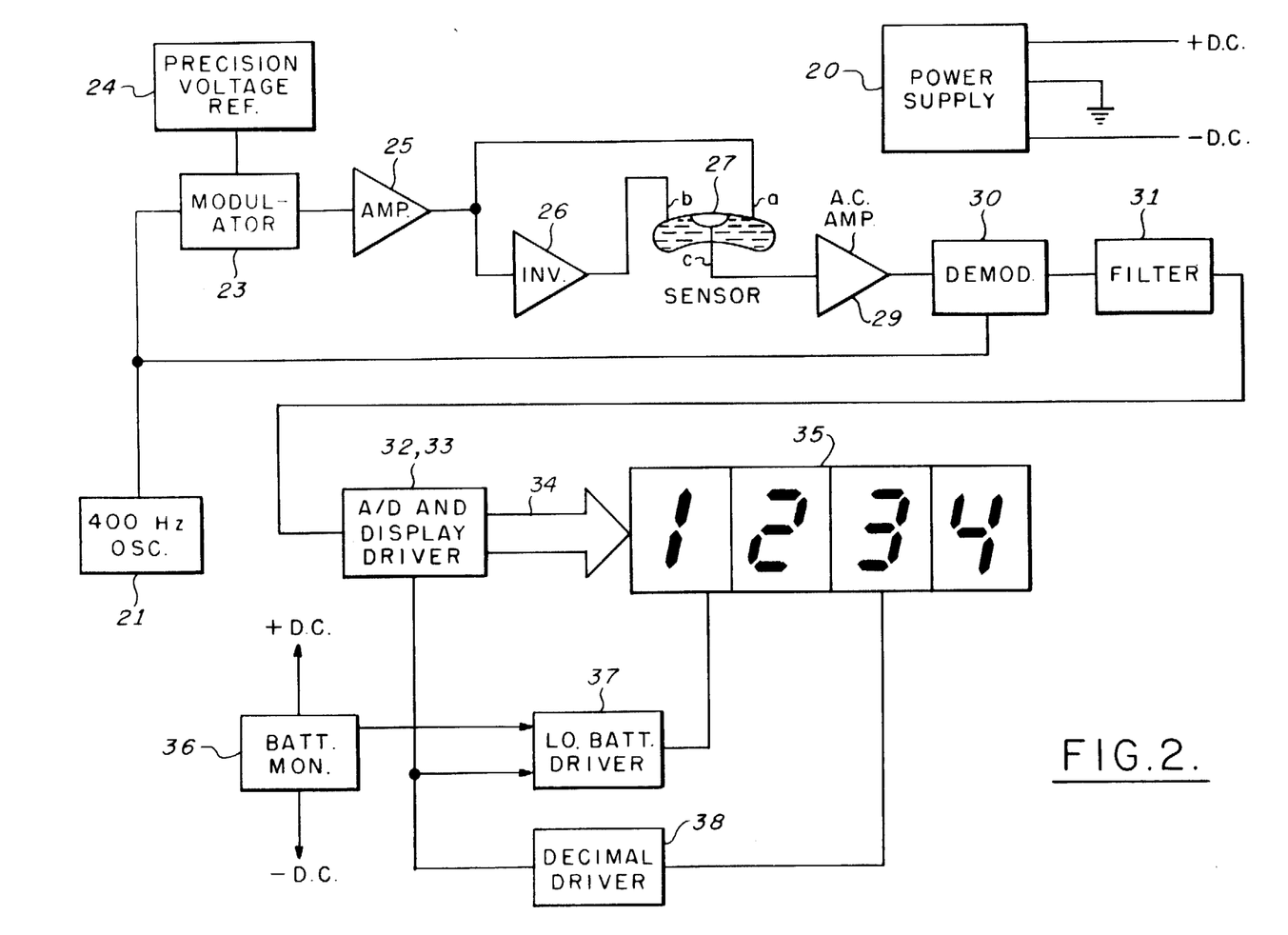
FIG. 2 is a block diagram of a preferred embodiment of the invention.

FIG. 2 shows a block diagram of a preferred embodiment of the invention. A battery, not shown, preferably a nine volt miniature type, energizes power supply 20. The power supply 20 provides balanced outputs +DC and −DC of equal and opposing polarities with respect to ground, derived from the battery (+4.5 and −4.5 for a nine-volt battery). Oscillator 21 provides a square wave at approximately 9.0 volts peak-to-peak and 400 Hz which drives modulator 23. Voltage reference 24 provides a regulated voltage derived from power supply 20 which is "chopped" by modulator 23 in accordance with the driving pulse. This provides a 400 Hz pulse of essentially constant peak amplitude to amplifier 25. Amplifier 25 drives inverter 26 and sensor 27, thereby providing energization of opposing phases relative to ground to contact electrodes a and b of sensor 27. A common electrode c is coupled to amplifier 29.

When the sensor is tilted, a differential signal is developed across the contacts a-c and b-c, whose amplitude and phase are determined by the tilt angle. The resultant signal at contact c is applied to amplifier 29. Amplifier 29 drives demodulator 30, synchronized with the drive to modulator 23 by oscillator 21, to provide a rectified dc pulse output. After smoothing by filter 31 the analog output feeds analog-to-digital converter 32 and the digital outputs are used to drive display driver 33, also housed on the same integrated circuit as converter 32, via multiple line bus 34 to energize LCD display 35 and provide a readout in accordance with the magnitude and direction of inclination of the sensor 27. Blocks 36 and 37 comprise a battery voltage monitor and driver, respectively, for energizing a low battery condition indicator on the LCD display when the battery voltage drops below a predetermined value, preferably of the order of seven volts for a nine volt battery. A pulse signal from display driver 33 drives decimal gate 38 to continuously energize the decimal point in the LCD display.

While the preferred embodiment is shown with an arcuate liquid level sensor, other electrolytic sensors are also suitable. These include toroidal sensors, such as disclosed in U.S. Pat. No. 3,823,486, issued July 16, 1974, to G. A. Bhat, et al; U.S. Pat. No. 3,992,951, issued Nov. 23, 1976 to J. R. Erspamer, et al; and U.S. Pat. No. 4,028,815, issued June 14, 1977 to C. G. Buckley, et al. Other types of sensors which may be adapted to this embodiment may be comprised of a pendulum with inductive, capacitive or optical pickoffs.

Figure 3:
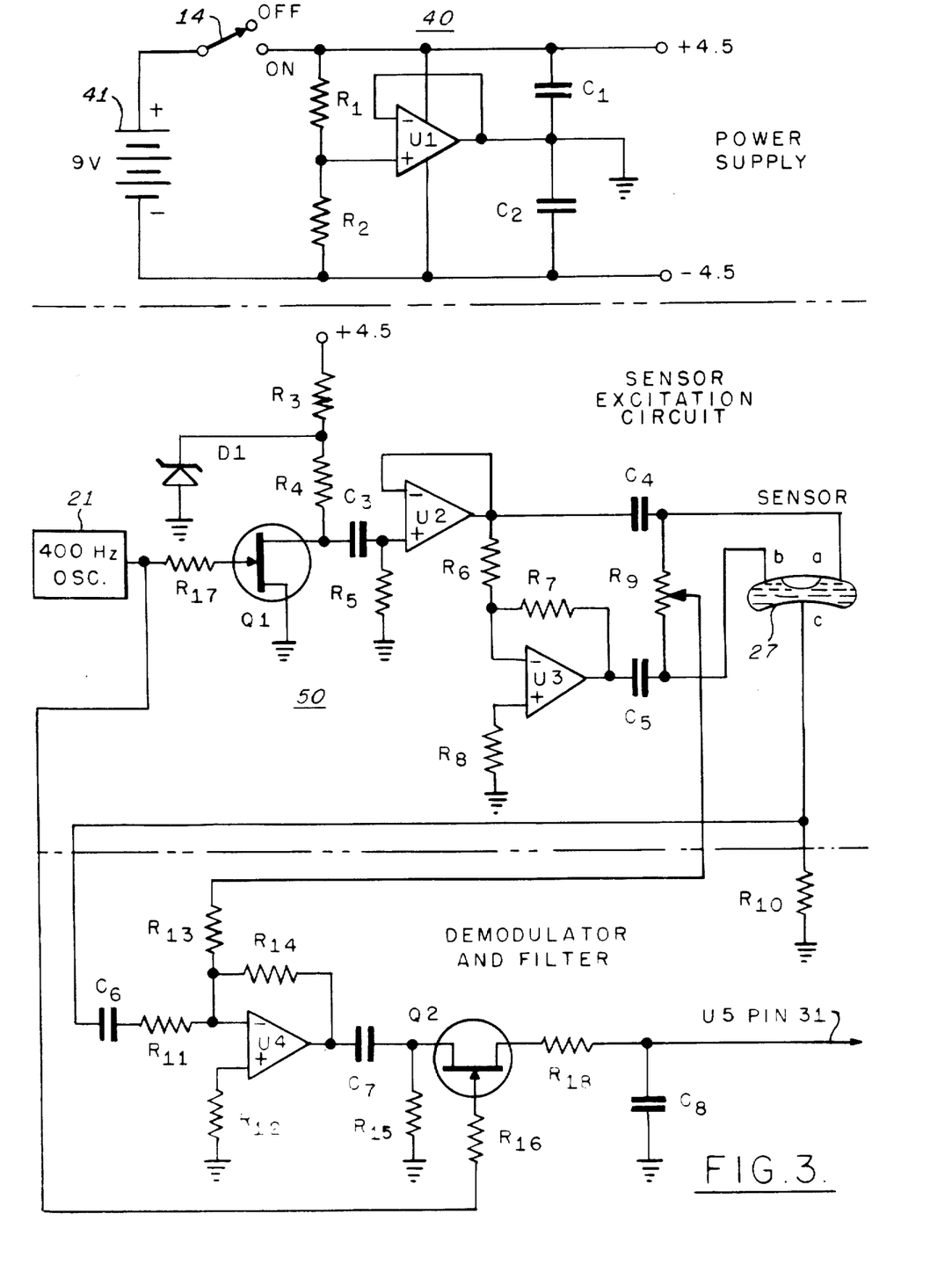
FIG. 3 is a schematic diagram showing the power supply, sensor excitation circuit and detector circuit of the preferred embodiment.

Detailed operation of the circuit is as follows. Referring to FIG. 3, a power supply 40 is energized by a dc battery 41, which may be a nine volt battery of the type commonly used in portable radios. Current from the battery, after passing through a power control switch 14, is applied to divider network $R_1, R_2$ which is preferably comprised of equal resistors of relatively high value to minimize battery drain. Amplifier $U_1$ may be comprised of one section of a quad linear operational amplifier integrated circuit which also includes $U_2$–$U_4$, to be described below. The junction of resistors $R_1$ and $R_2$ is applied to the positive input of amplifier $U_1$. The negative input of $U_1$ and the output of the amplifier form the ground reference for the electronic circuitry. It may be seen that the symmetric resistive network develops a midpoint voltage of 4.5 vdc at the positive input of $U_1$. $U_1$ is wired as a voltage follower, with the output voltage tracking the positive input voltage and unity gain. Under balanced conditions, no current flows through the ground return, and therefore $U_1$ is not called upon to deliver any power. If there is an imbalance in the current demands between the positive or negative legs and ground, the amplifier will supply the difference current, thus rebalancing the output voltages without drawing additional current through $R_1$ or $R_2$. This circuit thereby provides a very efficient means of providing positive and negative voltages of equal value from a common supply providing a low source impedance, which would otherwise require relatively low values of $R_1$ and $R_2$ with consequently heavy drain on the battery, or an active regulator, which has associated power losses. Capacitors $C_1$ and $C_2$, also preferably of equal value, provide additional storage capacity for smoothing the power supply output with respect to varying current demands.

FIG. 3 also shows the drive circuitry 50 for the electrolytic sensor. Oscillator 21 provides a 9.0 volt peak-to-peak 400 Hz square wave to modulator $Q_1$. Resistor $R_3$ drops the positive power supply voltage, which is of the order of 4.5 volts dc, to 2.5 volts dc. Zener diode $D_1$ must be of the type that has suitable temperature compensation to assure accurate operation of the inclinometer over a wide temperature range. Preferably, it should be suitable for use in the range of 32° F. to 110° F., such as type LM 236 as manufactured by National Semiconductor Corporation, Santa Clara, Calif., 95051.

The regulated voltage from $R_3$ is applied through load resistor $R_4$ to FET transistor modulator $Q_1$. $Q_1$ is driven by oscillator 21 to provide a precisely regulated pulsed output of 2.5 volts peak-to-peak to capacitor $C_3$ and resistor $R_5$. $C_3$ provides dc isolation, transmitting only the ac component of the input square wave. The ac voltage from $C_3$ is then applied to $U_2$ which buffers the signal to develop a low impedance 2.5 v peak-to-peak voltage for energizing contact a of sensor 27. $U_2$ also drives inverter $U_3$, which provides a signal of equal amplitude and opposite phase to contact b of sensor 27. Resistors $R_5$, $R_6$, $R_7$ and $R_8$ are used to establish input impedance and gain optimization.

Resistors $R_9$ and $R_{13}$ are used to supply an ac offset bias to $U_4$ to correct for irregularities in the mounting of the electrolytic sensor which would adversely effect the accuracy of the null response at zero inclination.

As shown in FIG. 3 signals are applied to sensor 27 at contacts a and b. Sensor 27 may be an electrolytic level, such as type CG-57S with MKI electrolyte, as manufactured by Spectron Glass and Electronics Inc., Uniondale, N.Y. 11553. The electrolyte is specially compounded to provide low viscosity and relatively high resistivity for this application. When the sensor is horizontal, the electrolyte contained therein provides paths of equal resistance between electrodes a-c and b-c. Since the voltages applied to a and b are opposing in phase, they sum to zero and provide no output at c with respect to ground. When sensor 27 is tilted, a differential voltage is developed between electrode c and ground, due to the differing resistive paths of the electrolyte, thereby applying a.c. drive to amplifier $U_4$.

The output from the common electrode c of level sensor 27 is developed across resistor $R_{10}$ and thereupon coupled to amplifier $U_4$ through series capacitor $C_6$ and resistor $R_{11}$. Dc blocking capacitors $C_4$, $C_5$, and $C_6$ serve to prevent any flow of dc current from $U_2$, $U_3$, or $U_4$ back to the electrolytic sensor, which could lead to damage of the sensor by precipitation of ions in the electrolyte, or by generating gases which could change the bubble size. $R_{11}$ serves to scale the input voltage to the negative input of amplifier $U_4$. The positive input of $U_4$ is referred to ground through resistor $R_{12}$. Resistor $R_{13}$ in combination with the bias voltage from $R_9$ applies an ac offset to the negative terminal of $U_4$. Resistor $R_{14}$ determines the gain of amplifier $U_4$. $U_4$ thereupon amplifies the variable sensor output and feeds it to capacitor $C_7$, which removes any dc offset voltage from $U_4$. The drive voltage is applied across resistor $R_{15}$ to FET transistor $Q_2$. $Q_2$ is gated through resistor $R_{16}$ by oscillator 21 in synchronism with $Q_1$, which is gated through $R_{17}$, thereby demodulating and providing a rectified half-wave square-wave. $R_{18}$ and $C_8$ filter the output of $Q_2$ to obtain a smooth dc output voltage proportional to the sensor tilt angle, and of positive or negative polarity, depending on the direction of tilt. The filtered dc output is then coupled to the analog-to-digital converter.

Figure 4:
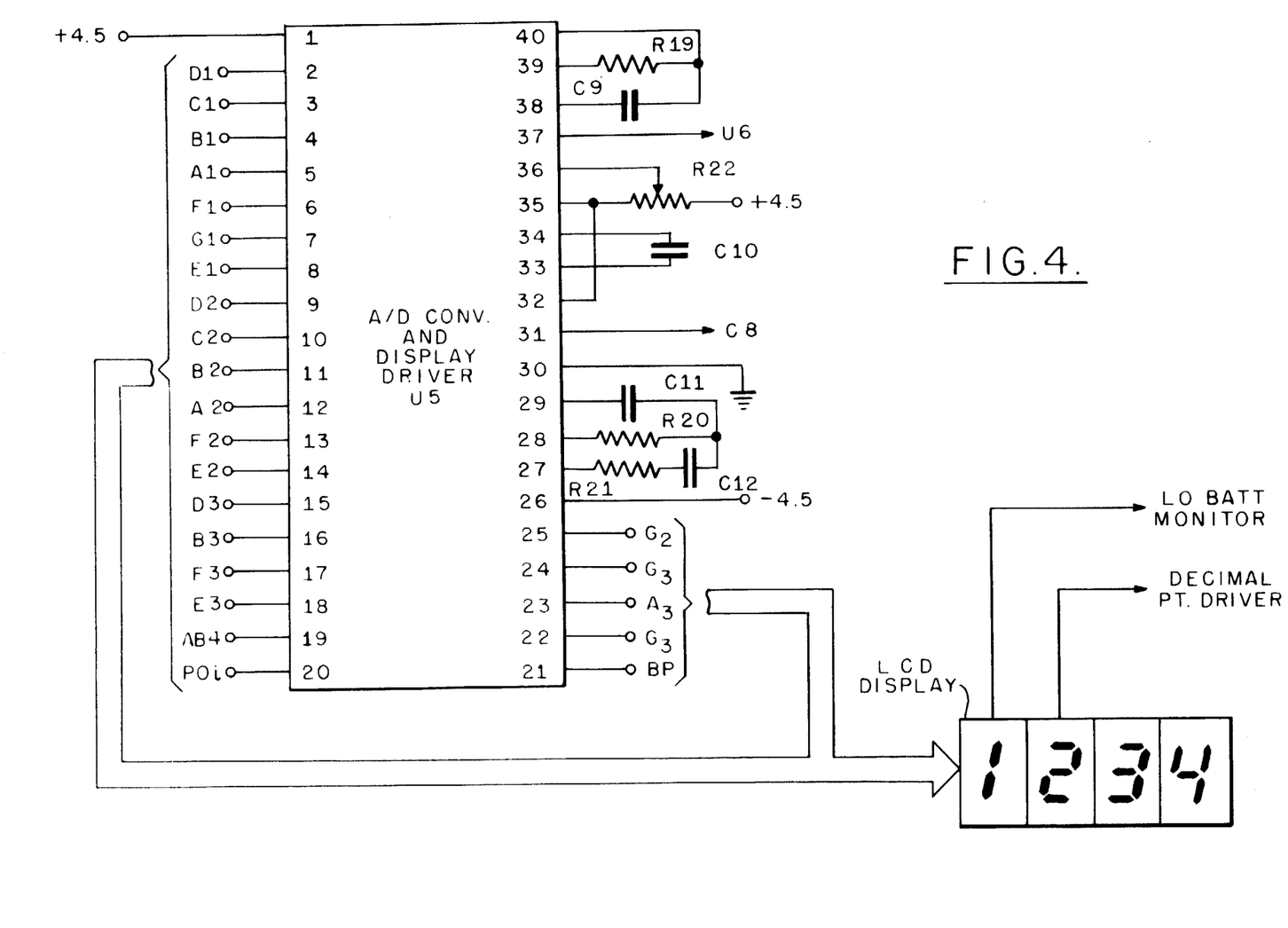
FIG. 4 is a schematic diagram showing circuitry for driving a liquid crystal display (LCD) for digital readout.

Referring now to FIG. 4, an integrated circuit chip $U_5$ provides circuitry for A/D conversion and for driving the LCD display. An analog input from $Q_2$ (see FIG. 3) is applied to pin 31 of $U_5$. The A/D section of the chip digitizes the analog signal and provides a corresponding binary coded decimal number at any instant of time. The display driver section converts the binary information into suitable 7 bit output code for driving a seven segment digital display. These functions are available on a single MSI chip such as the Intersil 7126, manufactured by Intersil, Sunnyvale, CA 94086.

Similar results may be obtained by using individual integrated circuits for A/D conversion, BCD encoding, and for driving the seven segment display. It will be recognized that the pin connections shown on FIG. 4 may be modified for the particular logic and display circuits chosen, which are not critical to the invention. Resistors $R_{19}$–$R_{21}$ and capacitors $C_9$–$C_{12}$ are chosen to provide the proper integration time constants, display sampling rate, and back plane pulse rate, as recommended by the component manufacturer. For the circuit herein, the back plane is pulsed at 50–60 Hz and the display is updated at 3 cps.

Beneficially, the Intersil 7126 analog/digital converter circuit contains provisions for automatic blanking of the three decimal digits of the display when the reading exceeds 1.999 or −1.999 respectively. The inclinometer uses this characteristic to advantage to prevent the user from acquiring inaccurate readings due to circuit or sensor saturation. The sensor range, circuit scaling, and decimal point placement are selected such that display blanking occurs just within the linear range of the sensor and the electronic circuitry. It will be clear to one skilled in the art that while individual component tolerances are not generally critical, judicious balancing and selection of inclinometer components permits use of the important blanking feature of the circuit while providing a sensor with adquate range.

Figure 5:
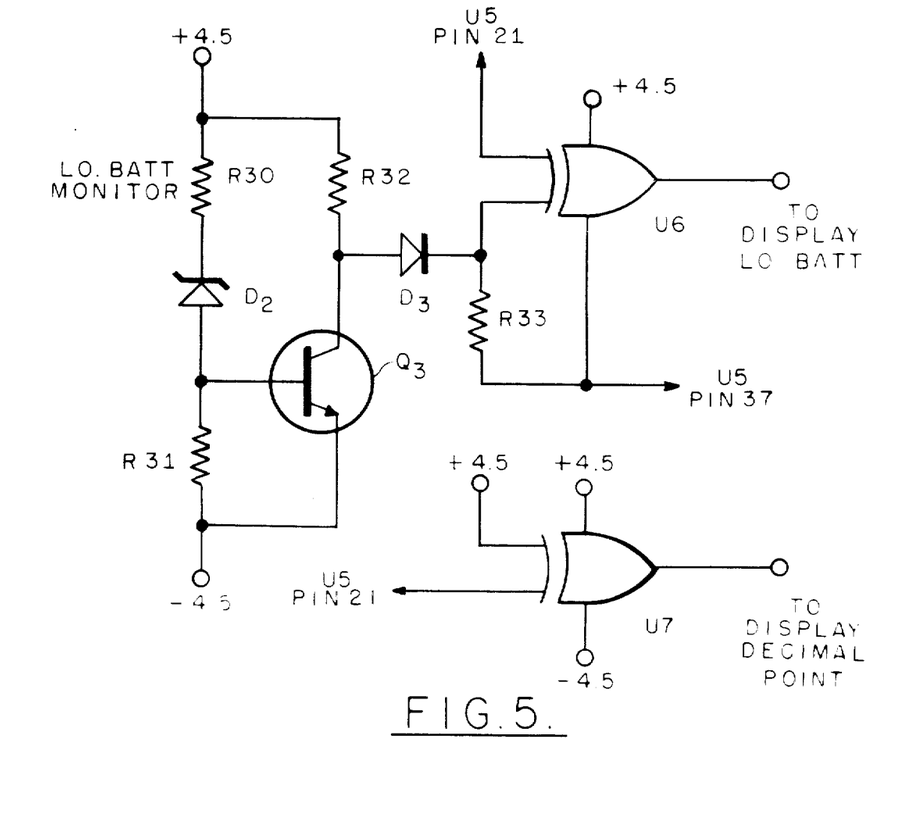
FIG. 5 is a schematic diagram showing circuitry for the decimal point and low battery display features for the LCD.

Referring now to FIG. 5, the low battery monitor is comprised of Zener diode $D_2$, diode $D_3$, transistor $Q_3$, and associated resistors. The operation of the low battery monitor is as follows. When the primary battery supply is seven volts dc or greater, $D_2$, which is selected to conduct at 6.2 to 6.8 vdc, will be biased into conduction through resistors $R_{30}$ and $R_{31}$. This will provide forward bias to the collector-to-base junction of Q3. Since the emitter-to-base junction is reversed biased by the negative supply and the drop across $R_{31}$, transistor $Q_3$ will be turned on. If biased into saturation, the collector-emitter voltage drop will be small, hence a negative potential from the −4.5 vdc supply will be applied to diode $D_3$. Diode $D_3$ will then inhibit conduction. Diode $D_3$ is used to protect from overdriving $U_6$, so that the maximum negative potential of 4.5 volts is never applied to the associated input of $U_6$, since the return for $R_{33}$ is to the display chip $U_5$, rather than common ground. $U_6$ is an Exclusive-OR gate, therefore, when the aforesaid diode input is clamped low, $U_6$ will provide an output corresponding to the pulse driving waveform from $U_5$ pin 21 which is applied at the second input. This output is the five-volt back plane pulse, and since there is no difference in potential between the back plane pulse and the voltage applied to the low battery terminal of the LCD, the "low battery" indicator will not be displayed. In the condition where the primary battery source is low, which is preferably established at less than seven volts, diode $D_2$ will be in a nonconducting state. The base to collector circuit will be open, and transistor $Q_3$ will therefore be nonconducting, which allows the positive battery voltage to be transferred via $R_{32}$ and $D_3$ to one input of $U_6$. Since the square wave back plane voltage is furnished to the second input, and since the Exclusive-OR gate will not provide an output when both inputs are energized, the effect is to invert the back plane voltage and apply a five volt potential with respect to the back plane voltage to the low battery terminal, thus activating the associated "low battery" display.

The decimal point display operates on a similar concept. A constant positive 4.5 vdc is applied to one input of Exclusive-OR gate $U_7$. The back plane pulse is applied to the second input of $U_7$. The back plane voltage is thereupon inverted in the gate to provide a 5.0 v output pulse whenever the back plane pulse is at zero, thus providing a continuous display of the decimal point whenever power is applied to the system.

Referring again to FIGS. 3 and 4, potentiometers $R_9$ and $R_{22}$ are used for null adjustment and scale factor adjustment, respectively. $R_9$ sums a portion of the sensor excitation voltages with the sensor output voltage to either add or subtract in the level position thereby to provide a fine adjustment of zero without the need for mechanically trimming the sensor mounting. $R_{22}$ trims the reference voltage to the A/D converter $U_5$ to adjust the gain or scale factor relating the inclination to the calibrated LCD display output.

Figure 6:
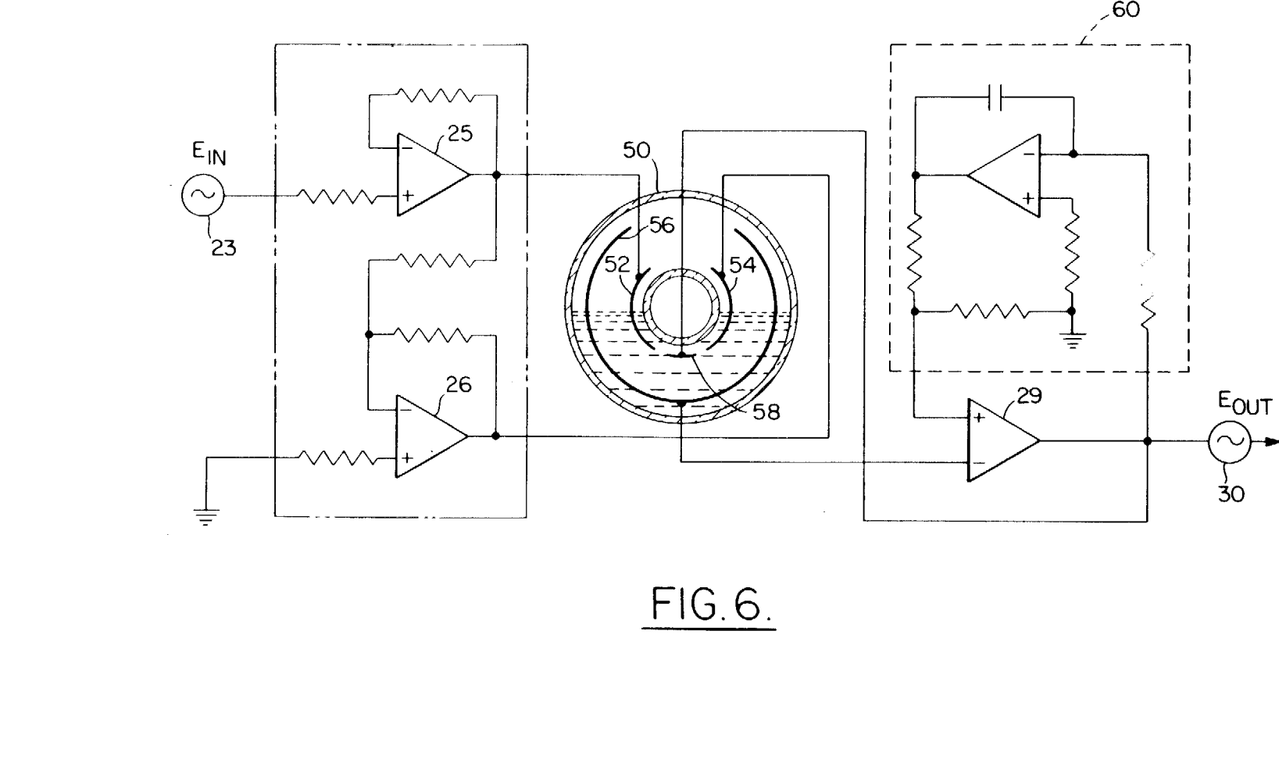
FIG. 6 is a schematic diagram showing an alternate preferred embodiment employing a toroidal sensor.

FIG. 6 shows an alternate preferred embodiment of the apparatus employing a toroidal type accelerometer. As noted in said U.S. Pat. No. 3,992,951, a sensor of this type features improved characteristics with respect to compensation for temperature variations. As shown in the Figure, an AC input signal 23 is coupled to an input of amplifier 25. The output of amplifier 25 is coupled to an arcuate electrode 52 of the toroidal sensor 50 and also coupled to phase inverter 26. The output of inverter 26 is coupled to a second opposing arcuate electrode 54. The alternating current signal output of sensor 50 is coupled from a third circumferential arcuate electrode 56 to one input of differential amplifier 29. As noted in said Patent '951, an electrode 58 disposed between electrodes 52 and 54 is provided for furnishing a signal to compensate for the effects of temperature on the electrolyte and expansion coefficient of the housing of the sensor. Circuit 60 represents a feedback loop for cancelling the influence of DC currents coupled from the output of amplifier 29 into the electrolyte via electrode 58. The structure and operation of this circuit is fully described in said Patent '951. The output of amplifier 29 is coupled to a demodulator 30 from whence the resultant signal may be processed for numerical readout as above.

The inclinometer of the present invention has numerous advantages over the prior art as follows:

1. It provides a precision digital readout with high stability and freedom from changes due to the surrounding temperature and battery drain over extended useage.

2. The components are selected for very low power consumption thus permitting long battery life. The analog-digital converter and Exclusive-OR gates are micropower CMOS devices and the amplifiers are also very low power operational amplifiers. Resistors are scaled with as high values as possible consistent with operational requirements in order to minimize power dissipation. A high impedance fluid in the liquid level sensor is also used to minimize current flow in the active attitudes.

3. By using an active voltage dividing technique, only a single battery is required to furnish positive and negative supply voltages. Being activated only when there is an imbalance in the current drains between the high and low supplies, the circuit supplies current only on demand and is therefore very economical.

4. After initial calibration adjustments for gain and null, no further calibration or operating adjustments are required. This is achieved by the use of a highly stable reference for developing ac excitation voltages independent of temperature.

5. The novel pulse modulation system permits using ac amplifiers and reduces errors due to dc drift and offset.

6. The high degree of miniaturization provided by integrated electronic components permits embodying the apparatus in a compact hand-held package. Both horizontal and vertical surfaces can be measured with a single device and with no change in operating adjustment.

7. The apparatus is direct reading, and does not require special technical skills to operate.

8. The inclinometer display provides automatic blanking of decimal digits before the linear range is exceeded to preclude the user from relying on angular slope indications which may be inaccurate.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An inclinometer providing a numerical readout, comprising:
    a housing in the form of a parallelepiped having first and second surfaces orthogonally disposed,
    passive power supply means for providing a plurality of essentially constant equivalue output voltages of opposing polarity from a single source potential,
    sensor means mounted to said housing, responsive to the influence of terrestrial gravitational force and disposed for gravity responsive output as a function of orientation of at least one of said surfaces relative to a reference axis,
    amplitude stabilized alternating current signal means non-inductively coupled to said sensor means for energizing said sensor means to provide a signal representing the sense and magnitude of inclination of said sensor with respect to said reference axis,
    detector means synchronously coupled to said alternating current signal means and said sensor means for providing a signal coincident in phase with said alternating current signal means when said sensor means is inclined with respect to said reference axis, and
    numerical indicator means, coupled to said detector means for providing a numerical output proportional to said inclination when said inclination is within a predetermined angular range, and for blanking said numerical output when said angular range is exceeded.

2. The inclinometer as set forth in claim 1, wherein said sensor means comprises:
    a liquid level, having an arcuate fluid-tight housing, partially filled with a suitable conductive liquid, and provided with a plurality of electrical contacts for contacting said liquid, at least two of said contacts being adapted for connection to said signal source, and at least one contact other than said two contacts being centrally disposed between said two contacts and adapted for connection to said detector means.

3. The inclinometer as set forth in claim 2 further comprising means coupled to said alternating current signal means for providing at least a portion thereof to said detector means in common with said gravity responsive output, for biasing said detector means to offset null errors in orientation of said sensor means with respect to said reference surface.

4. The inclinometer as set forth in claim 3 further comprising means for providing a predetermined reference voltage to said numerical indicator means, for biasing said indicator means to provide a substantially linear digital readout of slope in units of vertical displacement versus horizontal distance.

5. The inclinometer as set forth in claim 3 further comprising means for providing a predetermined reference voltage to said numerical indicator means, for biasing said indicator means to provide a substantially linear digital readout of slope in angular units.

6. The inclinometer as set forth in claim 1, wherein said sensor means comprises a toroidal electrolytic sensor having a housing containing an electrolytic fluid at least partially immersing a plurality of arcuate shaped electrodes disposed within said housing.

7. The inclinometer as set forth in claim 1, further comprising low battery monitoring means, including:
    means for sensing said source potential,
    means for deriving a reference voltage from said source potential,
    means for comparing said reference voltage with said sensed voltage to provide a control voltage, and
    low battery display driver means, responsive to said contral voltage, for energizing a low battery indicator in said numerical indicator means when said power supply provides a voltage which has decreased below a predetermined value.

8. An inclinometer, as set forth in claim 1, in which said numerical indicator means comprises a liquid crystal display.

9. The inclinometer as set forth in claim 8 in which said numerical indicator means includes a plurality of decimal digits.

10. The inclinometer as set forth in claim 1, in which said numerical indicator means comprises a plurality of light-emitting diodes.

11. The inclinometer as set forth in claim 1, in which said numerical indicator means comprises analog meter means.

12. The inclinometer as set forth in claim 1, in which said amplitude stabilized alternating current signal means is provided with a reference potential stabilized over a predetermined temperature range.

13. The inclinometer as set forth in claim 12, in which said reference potential comprises Zener diode reference means for stabilizing voltage and said temperature range is 32° F. to 110° F.

14. An improved circuit for a portable inclinometer of the type having an internal battery energized power supply, a gravitational sensor for providing an output signal responsive to an inclination thereof, an ac excitation signal for said sensor, and a digital display, wherein the improvement comprises:

active voltage divider means for receiving current and a single unregulated supply voltage from said battery and providing substantially equal dc output voltages of opposing polarity with respect to a common ground to first and second terminals, means in the form of a unitary transistor switch responsive to a source of alternating voltage and to one of said dc output voltages, for providing a first component of said ac excitation signal at a predetermined frequency, phase, and amplitude, phase inverter means for providing a second component of said ac excitation signal 180° out of phase with said first component, at said predetermined frequency and said amplitude, responsive to said source of alternating voltage, non-inductive means for differentially coupling said first and second ac signal components to energize said gravitational sensor, demodulator means in the form of a unitary transistor switch coupled to said output signal of said sensor, phase synchronized with said source of alternating voltage, for providing a dc signal responsive to said inclination, analog-to-digital converter means, responsive to said dc signal, for transforming said signal in analog form to an equivalent signal in binary digit form, and display driver means coupled to said converter means and responsive to said signal in binary digit form, for energizing said digital display when said inclination is within a predetermined range, and for blanking said display when said inclination exceeds said predetermined linear range.

15. A circuit for a power supply as set forth in claim 14 wherein said active voltage means further comprises:

resistive voltage divider means, coupled to said battery, having a positive and a negative terminal, and having a tie point disposed intermediate said terminals, and operational amplifier means having differentially disposed inputs, one of said inputs coupled to said tie point, and one input other than said one coupled to said ground, said amplifier having an output also coupled to said ground, whereby said ground is electrically disposed intermediate said positive and negative terminals, said amplifier being activated only when unequal loads are applied between said positive terminal and ground and said negative terminal and ground.

* * * * *